(12) United States Patent
Smith

(10) Patent No.: US 6,922,982 B1
(45) Date of Patent: Aug. 2, 2005

(54) MARINE WEEDWAKER

(76) Inventor: Daniel Smith, 3170 Wooster Dr., Dover, PA (US) 17315

( * ) Notice: Subject to any disclaimer, the term of this patent is extended or adjusted under 35 U.S.C. 154(b) by 53 days.

(21) Appl. No.: 10/613,812

(22) Filed: Jul. 5, 2003

Related U.S. Application Data

(60) Provisional application No. 60/393,471, filed on Jul. 5, 2002.

(51) Int. Cl.[7] .............................................. A01D 44/00
(52) U.S. Cl. .............................................. 56/8; 440/73
(58) Field of Search ............................. 56/8; 440/73, 6

(56) References Cited

U.S. PATENT DOCUMENTS

| | | | |
|---|---|---|---|
| 425,019 A | | 4/1890 | Bower |
| 2,319,947 A | * | 5/1943 | Oswood ....................... 440/73 |
| 2,355,842 A | * | 8/1944 | Arado .............................. 56/8 |
| 2,470,874 A | * | 5/1949 | Sidney ............................. 56/8 |
| 2,894,477 A | * | 7/1959 | Brown ......................... 440/71 |
| 3,467,052 A | * | 9/1969 | Hadler ......................... 440/73 |
| 3,520,117 A | * | 7/1970 | Metzler et al. ................... 56/8 |
| 3,859,953 A | * | 1/1975 | Todt ............................. 440/72 |
| 4,450,670 A | * | 5/1984 | Robinson ......................... 56/8 |
| 4,826,461 A | * | 5/1989 | Newman ...................... 440/71 |
| 4,925,412 A | * | 5/1990 | Karls ........................... 440/71 |
| 5,807,150 A | * | 9/1998 | Minter, Sr. ................... 440/73 |
| 6,159,060 A | * | 12/2000 | Purnell et al. ................ 440/46 |

FOREIGN PATENT DOCUMENTS

GB        2028243 A  *  3/1980  ........... B63B 17/00

* cited by examiner

Primary Examiner—Thomas S. Will
Assistant Examiner—Alicia Torres
(74) Attorney, Agent, or Firm—Matthew J. Peirce

(57) ABSTRACT

A weed cutting apparatus for use in water is disclosed. The weed cutting apparatus would be designed to cut weeds within a body of water without having the weeds tangle on the present invention.

4 Claims, 2 Drawing Sheets

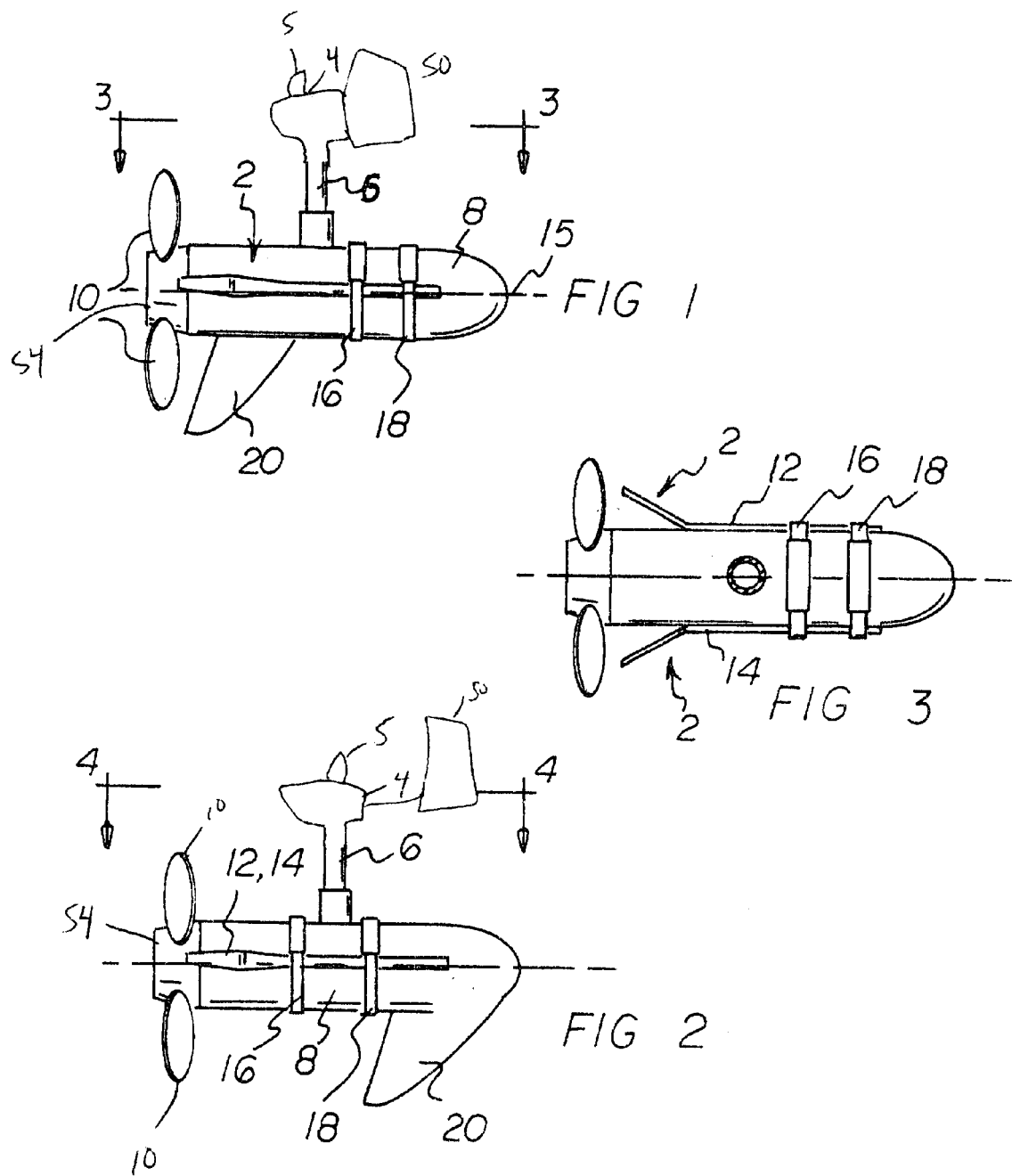

MARINE WEEDWAKER

This application claims the benefit of provisional application 60/393,471 filed Jul. 5, 2002.

I. BACKGROUND OF THE INVENTION

The present invention concerns that of a new and improved weed cutting apparatus for use in water.

II. DESCRIPTION OF THE PRIOR ART

U.S. Pat. No. 5,807,150, issued to Minter Sr., discloses a blade system capable of being attached to a trolling motor for cutting weeds and aquatic plants that can entangle in the propeller of a boat.

U.S. Pat. No. 4,450,670, issued to Robinson, discloses a cutting blade that is attachable to a trolling motor housing using a clamping ring, for purpose of preventing weeds and underwater foliage from fouling the drive mechanism.

U.S. Pat. No. 425,019, issued to Bower, discloses a blade attachment to prevent weeds from winding around the screw and shaft of a launch.

III. SUMMARY OF THE INVENTION

The present invention concerns that of a new and improved weed cutting apparatus for use in water. The weed cutting apparatus would be designed to cut weeds within a body of water without having the weeds tangle on the present invention.

There has thus been outlined, rather broadly, the more important features of a weed cutting apparatus so that the detailed description thereof that follows may be better understood and in order that the present contribution to the art may be better appreciated. There are, of course, additional features of the weed cutting apparatus that will be described hereinafter and which will form the subject matter of the claims appended hereto.

In this respect, before explaining at least one embodiment of the weed cutting apparatus in detail, it is to be understood that the weed cutting apparatus is not limited in its application to the details of construction and to the arrangements of the components set forth in the following description or illustrated in the drawings. The weed cutting apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present weed cutting apparatus. It is important, therefore, that the claims be regarded as including such equivalent constructions insofar as they do not depart from the spirit and scope of the present invention.

It is therefore an object of the present invention to provide a weed cutting apparatus which has all of the advantages of the prior art and none of the disadvantages.

It is another object of the present invention to provide a weed cutting apparatus which may be easily and efficiently manufactured and marketed.

It is another object of the present invention to provide a weed cutting apparatus which is of durable and reliable construction.

It is yet another object of the present invention to provide a weed cutting apparatus which is economically affordable and available for relevant purchasing government entities.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 1 shows a side view of the first embodiment of the weed cutting apparatus.

FIG. 2 shows a side view of an alternative embodiment of the weed cutting apparatus.

FIG. 3 shows a top view of the first embodiment of the weed cutting apparatus.

V. DESCRIPTION OF THE PREFERRED EMBODIMENT

Figure 4:
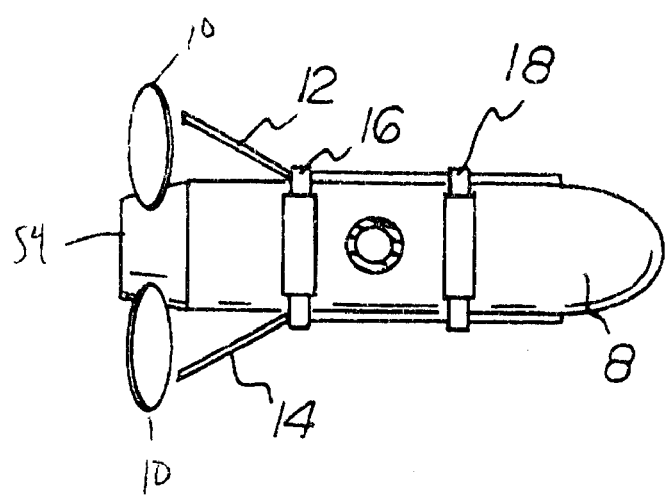
FIG. 4 shows a top view of an alternative embodiment of the weed cutting apparatus.

Priority is hereby claimed to application 60/393,471, filed on Jul. 5, 2002.

FIG. 1 shows a side view of one embodiment of the weed cutting apparatus 2, while FIG. 3 shows a top view of the same embodiment of weed cutting apparatus 2. Weed cutting apparatus 2 would comprise a trolling motor 4, a shaft 6, base 8, a plurality of propeller blades 10 rotatably attached to the base 8, a pair of knives 12 and 14, and a pair of clamps 16 and 18 to hold down the knives in place. Motor 4 would be powered by power means which could either be a small gasoline engine or an incorporated battery.

Trolling motor 4 has a top and a bottom and is mounted on a boat 50. Handle 5 is located on the top of trolling motor 4. Shaft 6 has two ends, a top end and a bottom end, with the top end of the shaft 6 attached to the bottom of the trolling motor 4. The bottom end of shaft 6 is attached to the base 8, which is cylindrically-shaped, in between the first end and the second end of the base 8. The second end of shaft 6 is attached to the side of base 8, which has two ends, a first end and a second end.

The first end of base 8 would be rounded. The second end of base 8 would have a propeller base 54 axially attached, with the propeller base 54 being rotatable. A plurality of propellor blades 10 are attached to the base 8, with the propellor blades 10 evenly spaced out from one another and sharing a common axis 15 to allow even rotation. Base 8 would also contain a tail fin 20; which would be located on the base 8 near the second end of base 8.

The pair of knives 12 and 14 each have two ends, a sharp end and a dull end. The dull end of each knife is strapped to base 8 by a pair of clamps 16 and 18, which would be removable. In the embodiment shown in FIGS. 1 and 3, the clamps 16 and 18 would envelop the base 8 in between the connection point of the shaft 6 and the second end of the base 8. Approximately one-fourth of the length of knives 12 and 14 would be bent outward at a forty-five (45) degree angle, with the bend occurring closer to the sharp side of each knife. Each of the knives is located one hundred eighty degrees from the other knife.

In use, an individual would insert the base 8 into a body of water and move the first end of the base 8 toward a bunch of weeds. As the plurality of propellor blades 10 would turn, they would draw weeds into the knives 12 and 14. As the plurality of propeller blades 10 turns, it would twist weeds and force them into the knives, thereby cutting them without clogging up the plurality of propellor blades 10.

FIG. 2 shows a side view of an alternative embodiment of the weed cutting apparatus. FIG. 4 shows a top view of an alternative embodiment of the weed cutting apparatus. Weed cutting apparatus 2 would comprise a trolling motor 4, a shaft 6, base 8, a plurality of propeller blades 10 rotatably attached to the base 8, a pair of knives 12 and 14, and a pair of clamps 16 and 18 to hold down the knives in place.

Trolling motor 4 has a top and a bottom and is mounted on a boat 50. Handle 5 is located on the top of trolling motor 4. Shaft 6 has two ends, a top end and a bottom end, with the top end of the shaft 6 attached to the bottom of the trolling motor 4. The bottom end of shaft 6 is attached to the base 8, which is cylindrically-shaped, in between the first end and the second end of the base 8. The second end of shaft 6 is attached to the side of base 8, which has two ends, a first end and a second end.

The first end of base 8 would be rounded. The second end of base 8 would have a propeller base 54 axially attached, with the propeller base 54 being rotatable. A plurality of propellor blades 10 are attached to the base 8, with the propellor blades 10 evenly spaced out from one another and sharing a common axis 15 to allow even rotation. Base 8 would also contain a tail fin 20, which would be located on the base 8 near the second end of base 8.

The pair of knives 12 and 14 each have two ends, a sharp end and a dull end. The dull end of each knife is strapped to base 8 by a pair of clamps 16 and 18, which would be removable. In the embodiment shown in FIGS. 2 and 4, clamps 16 and 18 are located on either side of the shaft 6, unlike FIGS. 1 and 3. Approximately one-fourth of the length of knives 12 and 14 would be bent outward at a forty-five (45) degree angle, with the bend occurring closer to the sharp side of each knife. Each of the knives is located one hundred eighty degrees from the other knife.

In use, an individual would insert the base 8 into a body of water and move the first end of the base 8 toward a bunch of weeds. As the plurality of propellor blades 10 would turn, they would draw weeds into the knives 12 and 14. As the plurality of propellor blades 10 turns, it would twist weeds and force them into the knives, thereby cutting them without clogging up the plurality of propellor blades 10.

Figure 5:
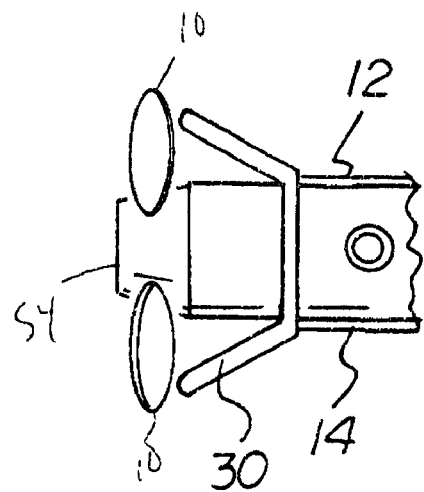
FIG. 5 shows a top view of the first end of the first embodiment of the present invention.
Figure 6:
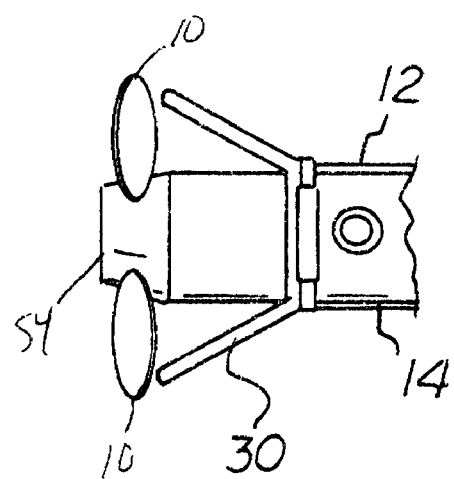
FIG. 6 shows a top view of the first end of the alternative embodiment of the present invention.

FIGS. 5 and 6 show top views, respective, of the first end of the two embodiments disclosed herein. Each of these two embodiments is shown with a knife cover 30, with the knife cover 30 designed as a one-part cover piece for the knives 12 and 14 of each embodiment. Knife cover 30 would be designed to be placed over knives 12 and 14 when the present invention would not be in use or when an individual would not desire to use the weed wacking capabilities of the present invention.

What I claim as my invention is:

1. An apparatus for cutting weeds in a body of water, the apparatus comprising:
   (a) a trolling motor having a top and a bottom,
   (b) a handle attached to the top of the trolling motor,
   (c) a shaft having two ends, a top end and a bottom end, the top end of the shaft attached to the bottom of the trolling motor,
   (d) a base having two ends, a first end and a second end, the base being cylindrical in shape, the bottom end of the shaft attached to the base between the first end and the second end of the base,
   (e) a propeller base axially attached to the second end of the base, the propeller base being rotatable,
   (f) a plurality of propeller blades attached to the propeller base, the propeller blades being evenly dispersed around the perimeter of the propeller base,
   (g) a tail fin attached to the base near the second end of the base,
   (h) a pair of knives comprising a first knife and a second knife, each knife having two ends, a dull end and a sharp end, each knife having a forty-five degree bend about one-fourth the distance between the sharp end and the dull end, the bend on each knife being closer to the sharp end than the dull end,
   (i) at least one clamp for securing the dull end of each knife to the base, wherein each of the knives is one-hundred eighty degrees from the other knife, and further wherein the sharp end of each knife extends away from the base,
   (j) wherein forward movement of the base causes the propeller blades to move weeds within a body of water against the knives, thereby cutting the weeds.

2. An apparatus for cutting weeds in a body of water according to claim 1 wherein the apparatus includes two clamps for securing the dull end of each knife to the base.

3. An apparatus for cutting weeds in a body of water according to claim 2 wherein one of the two clamps is located between the first end of the base and the shaft and the other clamp is located between the second end of the base and the shaft.

4. An apparatus for cutting weeds in a body of water according to claim 2 wherein both of the clamps are located in between the first end of the base and the shaft.

* * * * *